F. D. CLEVELAND.
MACHINE FOR CUTTING OFF THE HEADS AND TAILS OF FISH.
APPLICATION FILED JAN. 6, 1913.

1,078,717.

Patented Nov. 18, 1913.

2 SHEETS—SHEET 1.

F. D. CLEVELAND.
MACHINE FOR CUTTING OFF THE HEADS AND TAILS OF FISH.
APPLICATION FILED JAN. 6, 1913.

1,078,717.

Patented Nov. 18, 1913.

2 SHEETS—SHEET 2.

Witnesses.
Franklin E. Low.
Leonard A. Powell.

Inventor:
Francis D. Cleveland,
by his attorney, Charles N. Gooding.

UNITED STATES PATENT OFFICE.

FRANCIS D. CLEVELAND, OF WINCHESTER, MASSACHUSETTS, ASSIGNOR TO WILLIAM UNDERWOOD COMPANY, OF BOSTON, MASSACHUSETTS, A CORPORATION OF MASSACHUSETTS.

MACHINE FOR CUTTING OFF THE HEADS AND TAILS OF FISH.

1,078,717.  Specification of Letters Patent.  Patented Nov. 18, 1913.

Original application filed July 23, 1910, Serial No. 573,515. Divided and this application filed January 6, 1913. Serial No. 740,281.

*To all whom it may concern:*

Be it known that I, FRANCIS D. CLEVELAND, a citizen of the United States, residing at Winchester, in the county of Middlesex and State of Massachusetts, have invented new and useful Improvements in Machines for Cutting Off the Heads and Tails of Fish, of which the following is a specification.

This invention relates to a machine for cutting off the heads and tails of fish, such, for instance, as the fish known as sardines, preparatory to canning the same.

The invention consists in the combination and arrangement of parts set forth in the following specification and particularly pointed out in the claims thereof.

This application is a division from the application of Francis D. Cleveland, Machine for cutting off heads and tails of fish, Serial No. 573,515, filed July 23, 1910; and embodies certain features which were originally presented in that application but which cannot be made the subject matter of specific claims relating thereto, for which reason applicant files the present application as a division of said application Serial No. 573,515.

Figure 1:
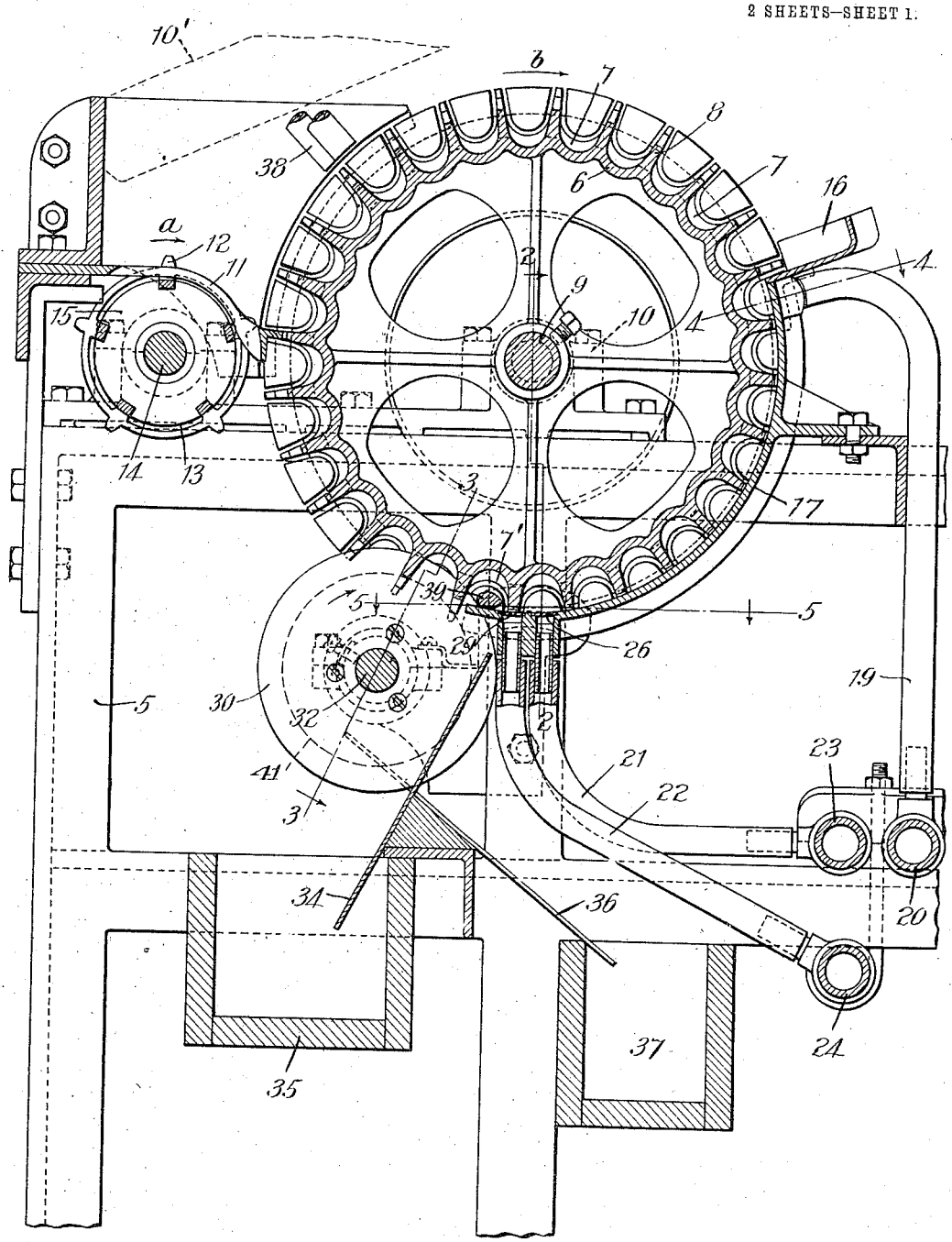
Figure 2:
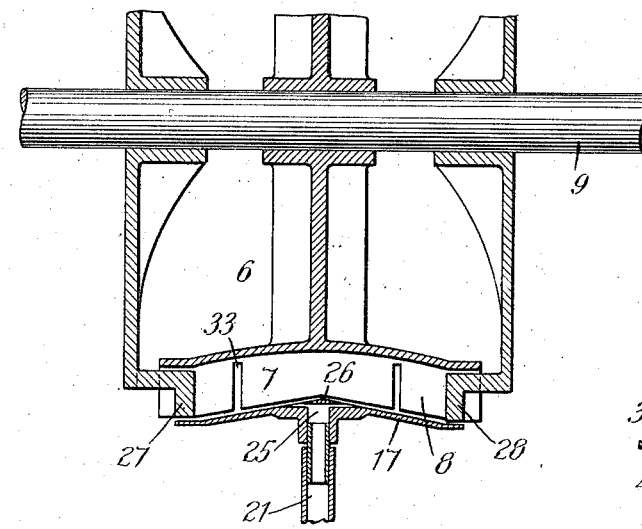
Figure 5:
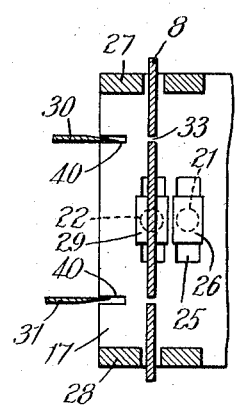
Figure 3:
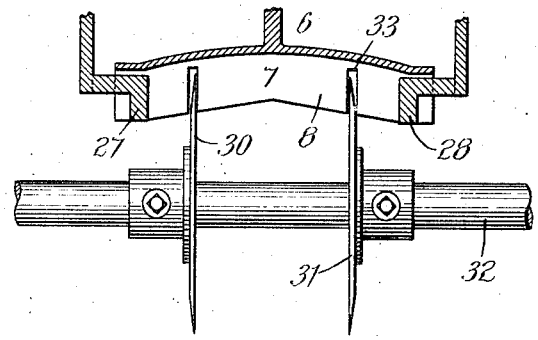
Figure 4:
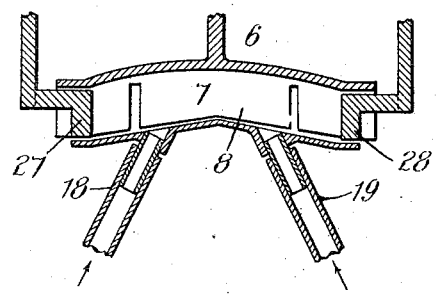

Referring to the drawings: Figure 1 is a sectional elevation of my improved machine. Fig. 2 is a detail sectional elevation taken on line 2—2 of Fig. 1. Fig. 3 is a detail sectional elevation taken on line 3—3 of Fig. 1. Fig. 4 is a detail sectional elevation taken on line 4—4 of Fig. 1. Fig. 5 is a detail section taken on line 5—5 of Fig. 1, showing the lower end of the semi-circular cover and the rotary cutters in their relative location thereto, and a portion of one of the partitions of the carrier shown in section.

Like numerals refer to like parts throughout the several views of the drawings.

In the drawings, 5 is the frame of the machine and 6 is a rotary carrier with pockets 7, 7 provided in the periphery of said carrier for the reception of the fish from which the heads and tails are to be removed. Said pockets are separated one from the other by partitions 8, 8 extending longitudinally of the carrier 6. It will be seen, therefore, that said carrier is provided in its periphery with a series of parallel longitudinally channeled holding devices. The carrier, as a whole, is fastened to a shaft 9 journaled in suitable bearings 10 on the frame of the machine and is rotated in any suitable manner, as for instance, by a pulley fast to said shaft 9.

The fish are delivered to the machine through any suitable chute, as, for instance, the chute 10' indicated in dotted lines, Fig. 1, and pass from said chute onto a guide-plate 11 which is slotted to allow the teeth 12 of a feed wheel 13 to project therethrough, said feed wheel being fastened to a shaft 14 and rotated by a pulley 15 in the direction of the arrow *a*. The teeth projecting through the guide-plate 11 feed the fish along down said guide-plate toward the right (Fig. 1) and into the pockets 7, 7 as said pockets pass upwardly past the end of said plate, the carrier being rotated in the direction of the arrow *b*.

A tray 16 is located at the right of the carrier 6 and extending downwardly from beneath said tray to the bottom of the carrier is a cover 17, the inner face of which is adjacent to the periphery of the carrier 6. By reference to Figs. 2 and 4 it will be seen that said cover is convex in cross sectional contour. To the upper end of said cover are connected two pipes (Fig. 4) 18 and 19 inclined toward the central portion of the periphery of the wheel and through these pipes water is supplied from a supply pipe 20. It will be noted that the pipes 18 and 19 constitute oppositely disposed means for directing jets of fluid under pressure into the channeled holding devices successively as the carrier 6 is rotated, and that these pipes are located so as to deliver streams at points between the centers and the extreme ends of said holding devices. To the lower end of the cover 17 are connected two pipes 21 and 22 to which water is supplied by pipes 23 and 24. The pipe 21 leads into an outlet orifice 25 formed in the cover 17 (see Fig. 2) and just above said outlet orifice is a deflecting plate 26 which deflects the water in opposite directions from the center of the carrier 6 toward the outside thereof, and in a direction substantially parallel to the inner face of said cover. The opposite ends of the pockets 7, 7 are substantially closed to prevent the fish from being driven out of the pockets by the flow of the water, by annular gages 27 and 28, respectively, these gages being fastened to the shaft 9 and adjustable longitudinally of said shaft to accommodate varying lengths of fish, according to the size fish which are being handled by the machine. It will be noted that the gages 27 and 28 constitute stops, therefore, to prevent the fish from being moved entirely out of the pocket or channeled holding device, but that there is a space between the edges of the gages or stops 27 and 28 and the bottoms and sides of the pockets 7 (see Figs. 1 and 4). This space is for the purpose of allowing the water to flow out at the ends of the pockets in the carrier while the gages or stops prevent the fish from so doing. Thus said gages, together with the pockets arranged as described, with a space therebetween, constitute a sieve. The outlet of the pipe 22 is similar in all respects to the outlet of the pipe 21 just described and is provided also with a deflecting plate 29 (Fig. 1).

The pipes 21 and 22 are located just in advance of a pair of rotary cutters 30 and 31 which are fastened to a shaft 32 journaled in suitable bearings on the frame of the machine and rotated by a pulley 41 fast to the shaft 32, Fig. 1. These rotary cutters project into the pockets 7, 7 as the carrier rotates and extend transversely of said pockets. The partitions 8 are provided with slots 33, 33 to allow the cutters to project into said pockets and these slots are in alinement with the rotary cutters 30 and 31.

The fish bodies pass between the cutters 30 and 31 after having the heads and tails cut therefrom and drop onto the chute 34, down which they slide into the receptacle 35, while the heads and tails which are cut from these fish bodies pass on the outside, respectively, of the rotary cutters 30 and 31 and onto the two chutes 36, 36 located outside said cutters, and said heads and tails pass down the two chutes 36 into a receptacle 37.

Water is supplied to the machine hereinbefore described at various points, wherever it may be required to float the fish down the chute 10 and along the inclined guide plate 11 and also wherever it may be required to wash and cleanse the fish, and also wherever it may be required to position the fish properly in the pockets.

It will be understood that as the fish are delivered to the carrier, there may be one, two or three delivered to a single pocket, or they may be delivered with their heads all pointing one way, or they may be delivered in various positions, as, for instance, the fish may lie longitudinally within the pockets or they may extend transversely of the pockets. It is, however, the object of the invention, to have the fish lie longitudinally of the pockets with their heads against the annular gages 27 or 28, as the case may be, in order that when the heads and tails are cut from the fish, they shall be cut at the proper point and not spoil the fish by cutting the same in the wrong place. Therefore, as the rotary carrier 6 is rotated from the point at the left where the fish are first fed into the pockets by the feed wheel 13, pipes 38 are arranged to deliver water at the periphery of the feed wheel and preferably slightly at an angle, similar to the arrangement of the pipes 18 and 19, (Fig. 4). The number of pipes may be one, two or three, as may be desired and as found most efficient for the class of fish which is being handled, and other pipes may be arranged along the periphery of the carrier, if desired, the object being to float the fish longitudinally of the pockets, so as to position the same, as hereinbefore described, with their heads adjacent to the annular gages.

It will be understood that sufficient force might be directed through one set of pipes, such as the pipes 38 or the pipes 18 and 19, to force all of the fish longitudinally of the pockets up against the gages, but if sufficient force is thus supplied to drive the fish all up against the gages by one set of pipes, they will be driven with so much force that when the heads strike the gages some of the fish will bounce back and thus they will not be properly positioned. Therefore, it has been found more practical to supply water to the pockets from pipes discharging at the periphery of the carrier and at different points around the periphery in order to secure the best results. To this end the pipes are placed as at 38; others are placed as at 18 and 19 and still others are placed as at 21 and 22, so that gradually the fish are positioned properly longitudinally of the pockets, and finally, when they arrive at the pipes 21 and 22, the fish are positioned with their heads against the annular gages 27 or 28, as the case may be, and in readiness for the rotary cutters to sever the heads and tails from the bodies.

In addition to the effect produced by the flow of water from the different pipes on the fish to position them, as hereinbefore set forth, with their heads located against the annular gages 27 and 28, it will be noted that the cover 17, which is convex in cross sectional contour, aids in the placing of the fish in said position as said fish will naturally slide down toward the gages on said cover 17 as the carrier is rotated and as the fish pass along the under side of said carrier upon said shield prior to their arrival opposite the pipes 21 and 22. It will also be noted that the outlets of the pipes 21 and 22 are so close to the rotary cutters 30 and 31 that the fish are practically held with their heads against the annular gages, while the heads and tails are being severed from the bodies by the rotary cutters 30 and 31.

The general operation of the mechanism hereinbefore specifically described is as follows: The fish pass down the chute 10 and are delivered therefrom onto a guide plate 11, along which they are pushed by the teeth 12 of the feed wheel 13 and into the pockets 7, 7 of the carrier 6. Said carrier rotating in the direction of the arrow $b$ carries the fish upwardly until the pockets pass the pipes 38. At this time any fish which are not located in the pockets and lying longitudinally thereof, but which extend transversely of the pockets and outside the periphery of the carrier will be forced off of the wheel back onto the guide plate 11 by the streams of water which issue from the pipes 38; also any fish which are located in the pockets will be carried to a certain extent longitudinally of the pockets to bring their heads against the annular gages 27 or 28, respectively. Upon a still further rotation of the carrier, the fish are brought around toward the right (Fig. 1) until the pockets containing the same pass behind the cover 17 and just at the upper end of this cover and below the stay 16, jets of water issue from the pipes 18 and 19 and the fish are lifted and arranged still better longitudinally of the pockets by reason of the inflowing streams of water from said pipes 18 and 19; then as the carrier 6 continues its rotation the fish fall from the bottoms of the pockets onto the shield or cover 17. This cover closes the channeled holding devices or pockets during the discharge of the jets of water from the pipes 18 and 19 thereinto, and as the fish are carried around by the carrier 6 they slide outwardly on the convex-shaped cover 17 toward the gages 27 and 28, and as the pockets with the fish therein pass the outlets of the pipes 21 and 22, said fish are carried still farther toward the gages and held thereagainst by and in the diverging streams of water from the central portion of the carrier until they are carried completely toward and into engagement with the gages 27 and 28 at opposite sides of said carrier, so that the heads of the fish will be brought up gently against the gage 27 or the gage 28 and held there by the flowing streams of water, said streams of water being aided in the placing of the fish by the convex contour of the cover or shield 17. Upon further rotation of the carrier 6 the heads and tails of the fish are cut off by the rotary cutters 30 and 31.

In Fig. 1, a fish 39 is indicated located in the pocket 7' and this fish is just in position to be cut by the rotary cutters 30 and 31. Said fish is lying within the pocket 7' at the lower end of the cover 17 which acts to support the fish and to coact with the cutters 30 and 31 as they pass through the slots 40, 40 (Fig. 5) in the lower end of said cover, the partition 8 of the pocket acting to push the fish against the cutting edges of the rotary cutters. Thus the fish is held during the cutting operation by the inflowing streams of water from the pipe 22 with its head against an annular gage, the head and tail are cut off by the rotary cutters, and the fish, as a whole, is pushed toward the rotary cutters to assist in the cutting operation by the partition of the pocket, and said fish is held by the cover during the cutting operation until the heads and tails are severed from the bodies, whereupon the bodies pass downwardly between the rotary cutters 30 and 31 along the chute 34 and into the receptacle 35, while the heads and tails pass downwardly outside the cutters 30 and 31 onto the chute 36 and into the receptacle 37.

It will be understood that the partitions of the carrier, being slotted at 33, 33, coöperate in their forward movement as feed fingers or pushers with the rotary cutters 30 and 31 in the operation of severing the heads and tails from the bodies of the fish, and further in pushing off the heads and tails and the bodies of the fish, after they have been severed, onto their respective chutes, as hereinbefore set forth.

Particular attention is directed to the fact that the fish are floated by the streams of water toward the gages 27 and 28, with their heads resting against said gages, by reason of the water being directed in streams longitudinally of the pockets in opposite directions from the central portion of the carrier and substantially parallel to the inner face of the cover 17, and as soon as they arrive with their heads or tails bearing against the gages 27 or 28, as hereinbefore described, they are then immediately brought into contact with the rotary cutters which, being rotated very rapidly, sever the heads and tails with speed and precision.

It will be understood that as the fish arrive at the pipes 38 they are roughly positioned in the pockets; then when they arrive at the pipes 19 and 20 they are positioned still better in the pockets, and as the carrier is rotated as hereinbefore described and the fish fall from the pockets on the under side of the carrier against the cover 17, the convex shape of said cover assists in moving the fish toward the gages 27 and 28, leaving them all ready for the special final action of the streams 21 and 22, and these final streams 21 and 22, extending parallel to the inner surface of the cover, float the fish as if they were floating in a stream of water naturally outward toward the gages until the heads of the fish are resting against the gages, as hereinbefore described.

Having thus described my invention, what I claim and desire by Letters Patent to secure is:

1. A machine of the class described including an endless series of channeled holding devices, cutting elements adjacent the paths of the ends of said devices, and oppositely disposed means for directing jets of fluid under pressure into said holding devices successively at points between the centers and the ends of said holding devices, and at an angle to the length of said holding devices and to each other.

2. The combination, with a conveyer including channeled holding devices, of nozzles for directing jets of fluid under pressure into said holding devices successively at points between the centers and ends of each channel and at an angle to the length of said holding devices and to each other, separate cutting elements between the centers and ends of said channels for engaging the contents of said channels when shifted by said jets and means for maintaining the channels closed during the reception of said jets.

3. The combination, with a conveyer including a series of parallel longitudinally channeled holding devices, of oppositely disposed nozzles adjacent the ends of said devices for directing jets of fluid under pressure into said holding devices between the centers and the ends thereof, in opposite directions respectively and at an angle to the length of said holding devices, and cutting means adjacent the ends of said holding devices.

4. The combination, with a conveyer including holding devices having transversely extending channels, of nozzles for directing jets of fluid in opposite directions respectively into said channels successively at points between the centers and the ends of said channels and at an angle to the length of said holding devices, means for maintaining the channels closed during the discharge of the jets thereinto and cutting devices adjacent the ends of said channels.

5. The combination, with a conveyer including channeled holding devices, of nozzles for directing jets of fluid under pressure into said holding devices successively at points between the centers and the ends of said holding devices and at an angle to the length of said holding devices and to each other and separate cutting elements for engaging the contents of said channels subsequent to the direction of said jets into said channels.

6. The combination, with a conveyer including channeled holding devices, of nozzles for directing jets of fluid under pressure into said holding devices successively at points between the centers and the opposite ends of said holding devices, and at an angle to the length of said holding devices and to each other, separate cutting elements adjacent the ends of said channels for engaging the contents of said channels when shifted by said jets and means for maintaining the channels closed during the reception of the jets.

7. A machine for cutting off the heads and tails of fish comprising a support provided with a pocket, means for discharging fluid into said pocket between the center and one end thereof and at an acute angle to the length of said pocket, said means adapted to shift the fish longitudinally in said pocket, a stop for the other end of the pocket, said stop constituting a screen permitting the exhaust of said fluid and cutting means for the ends of said fish.

8. A machine for cutting fish having, in combination, an endless carrier provided with pockets in its periphery, means adapted to cut off the heads of fish located in said pockets and oppositely disposed means for directing jets of fluid under pressure into said pockets at points between the centers and the extreme ends of said pockets, and at an angle to the length of said pockets and to each other.

9. A machine for cutting fish having, in combination, an endless carrier provided with pockets in its periphery, means adapted to cut off the heads of fish located in said pockets, gages at opposite ends, respectively, of said pockets, means to feed fish into said pockets and oppositely disposed means for directing jets of fluid under pressure into said pockets at points between the centers and the extreme ends of said pockets, and at an angle to the length of said pockets and to each other.

10. A machine for cutting fish having, in combination, an endless carrier provided with pockets in its periphery, partitions on said carrier separating said pockets from each other and extending longitudinally of said carrier, a cutter projecting into said pockets transversely thereof, said partitions having slots therein in alinement with said cutter and oppositely disposed means for directing jets of fluid under pressure into said pockets at points between the centers and the extreme ends of said pockets, and at an angle to the length of said pockets and to each other.

11. A machine for cutting the heads off of fish having, in combination, an endless carrier provided with pockets in its periphery, means adapted to cut off the heads of fish located in said pockets, and a plurality of means for directing fluid under pressure and at an angle to the length of said pockets and to each other against fish located in said pockets, whereby said fish will be moved in the direction in which their heads may be pointed and into position for engagement by said cutters.

12. A machine for cutting the heads off of fish having, in combination, an endless carrier provided with pockets in its periphery, means adapted to cut off the heads of fish located in said pockets, annular gages at opposite ends, respectively, of said pockets and a plurality of means for directing fluid under pressure against fish in said pockets and at an angle to the length of said pockets and to each other, whereby said fish will be moved in the direction in which their heads may be pointed against said gages and into position for engagement by said cutters.

13. A machine for cutting fish having, in combination, an endless carrier provided with pockets in its periphery, means adapted to cut off the heads of fish located in said pockets, gages at opposite ends, respectively, of said pockets, a semi-circular cover adjacent to the periphery of said carrier and oppositely disposed means located in advance of said cutters adapted to direct jets of fluid into said pockets within said cover at an angle to the length of said pockets at points between the centers and the extreme ends of said pockets.

14. A machine for cutting fish having, in combination, a rotary carrier provided with pockets in its periphery, a pair of rotary cutters projecting into said pockets transversely thereof, means to impart a rotary motion to said cutters, gages at opposite ends, respectively, of said pockets, a cover adjacent to the periphery of said carrier provided with slots into which said rotary cutters are adapted to project and oppositely disposed means located in advance of said cutters adapted to direct jets of fluid under pressure into said pockets successively at points between the centers and the extreme ends of said pockets, and at an angle to the length of said pockets.

15. A machine for cutting the heads off of fish having, in combination, a conveyer with pockets in its periphery, a cutter, and means for directing fluid under pressure against a fish on said conveyer at an acute angle to the length of said pockets and intermediate the ends thereof, whereby said fish will be moved in the direction in which his head may be pointed and into position for engagement by said cutter.

16. A machine for cutting the heads off of fish having, in combination, a conveyer with pockets in its periphery, a cutter, a gage and means for directing fluid under pressure against a fish on said conveyer at an acute angle to the length of said pockets and intermediate the ends thereof, whereby said fish will be moved in the direction in which his head may be pointed into contact with said gage and into position for engagement by said cutter.

17. A machine for cutting off the heads of fish having, in combination, a conveyer with pockets in its periphery, separate oppositely disposed cutting means and means for directing fluid under pressure against a fish on said conveyer at an acute angle to the length of said pockets and intermediate the ends thereof, whereby said fish will be moved in the direction in which his head may be pointed and into position for engagement by the respective cutting means.

In testimony whereof I have hereunto set my hand in presence of two subscribing witnesses.,

FRANCIS D. CLEVELAND.

Witnesses:
 CHARLES S. GOODING,
 SYDNEY E. TAFT.